(12) United States Patent
Chang et al.

(10) Patent No.: US 8,805,053 B2
(45) Date of Patent: Aug. 12, 2014

(54) ELECTRONIC DEVICE AND METHOD FOR LOCATING MARKED NUMBER IN IMAGE OF OBJECT

(75) Inventors: Chih-Kuang Chang, New Taipei (TW); Xin-Yuan Wu, Shenzhen (CN); Wei-Quan Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 32 days.

(21) Appl. No.: 13/537,077

(22) Filed: Jun. 29, 2012

(65) Prior Publication Data

US 2013/0108144 A1 May 2, 2013

(30) Foreign Application Priority Data

Oct. 28, 2011 (CN) .......................... 2011 1 0333581

(51) Int. Cl.
*G06K 9/00* (2006.01)
(52) U.S. Cl.
USPC ........................... 382/141; 345/427; 382/190

(58) Field of Classification Search
USPC ................. 345/420, 427; 382/141, 190, 195; 700/98, 182; 703/1, 6
See application file for complete search history.

(56) References Cited

U.S. PATENT DOCUMENTS

| 7,653,245 | B2 * | 1/2010 | Love et al. .................... 382/190 |
| 2004/0267401 | A1 * | 12/2004 | Harrison ....................... 700/182 |
| 2007/0192176 | A1 * | 8/2007 | Onischuk ........................ 705/12 |
| 2008/0069458 | A1 * | 3/2008 | Vega-Higuera et al. ...... 382/232 |
| 2011/0243248 | A1 * | 10/2011 | Alshin et al. ............. 375/240.25 |
| 2013/0108144 | A1 * | 5/2013 | Chang et al. .................. 382/141 |

* cited by examiner

*Primary Examiner* — Gregory M Desire
(74) *Attorney, Agent, or Firm* — Novak Druce Connolly Bove + Quigg LLP

(57) ABSTRACT

A method for locating marked numbers in a two dimensional (2D) image of an object, a rectangular frame enclosing the 2D image is determined. The method divides a boundary of the rectangular frame into a plurality of segments, assigns an index number to each segment along a horizontal direction and a vertical direction of the rectangular frame. The method further obtains a marked number selected from a preset file, and locates a cursor on a first position of the marked number in the 2D image according to coordinates of the marked number, or locates the cursor on a second position of the marked number according to a horizontal index number and a vertical index number of the marked number.

20 Claims, 9 Drawing Sheets

ELECTRONIC DEVICE AND METHOD FOR LOCATING MARKED NUMBER IN IMAGE OF OBJECT

BACKGROUND

1. Technical Field

Embodiments of the present disclosure relate to measurement technology, and particularly to an electronic device and method for locating marked numbers in an image of an object using the electronic device.

2. Description of Related Art

Measurement is an important phase in manufacturing and is closely related to product quality. Point cloud obtaining devices have been used to obtain a point cloud of an object by scanning a large number of points on a surface of the object, processing the data in the point cloud, and subsequently extracting boundary elements including boundary points and boundary characteristics of the object, in order to form an image of the profile of the object.

The image of the object includes a plurality of feature elements (e.g., a line or a plane of the image) and a plurality of marked numbers (e.g., a digit) in relation to each of the feature elements. Generally, the marked number is positioned near to the corresponding feature element in the image of the object, so that a user can easily find the corresponding feature element according to the marked number. However, if the image of the object includes a large number of marked numbers, it is a time-consuming work to find a specific marked number manually as mentioned above. Therefore, a more efficient method for automatically locating marked numbers in an image of an object is desired.

BRIEF DESCRIPTION OF THE DRAWINGS

FIG. 8 is an exemplary schematic diagram of a text file storing positional information of the marked numbers of the 2D image in FIG. 6.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
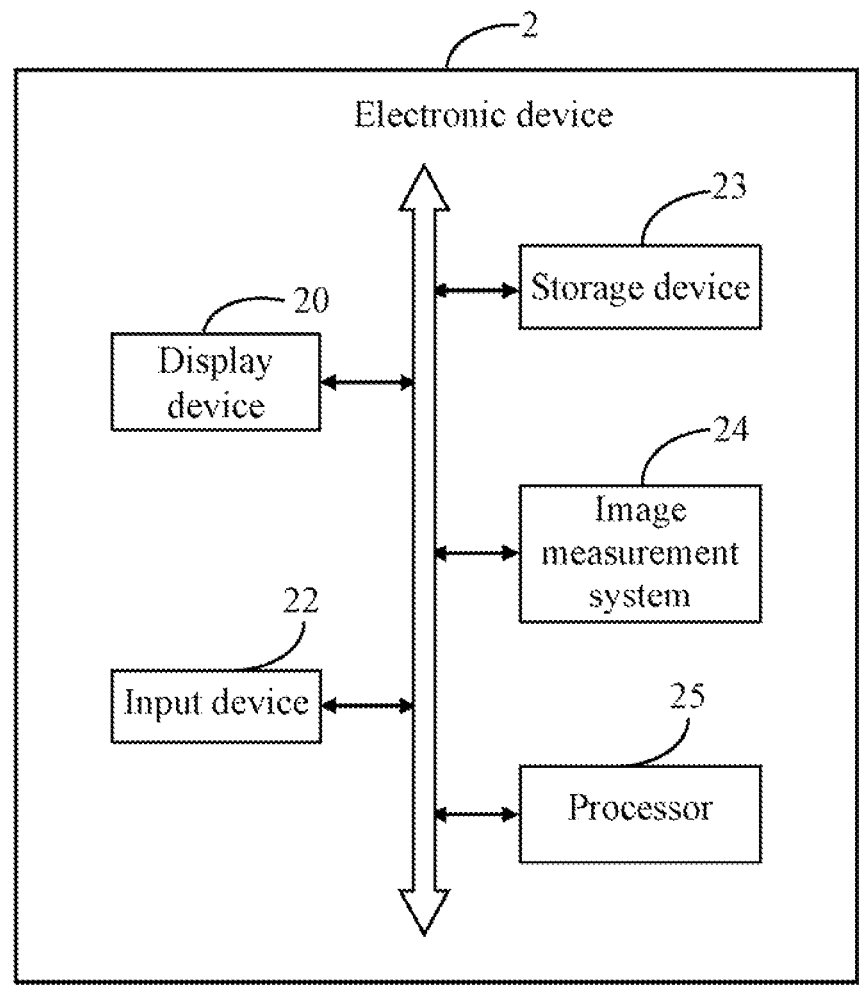
FIG. 1 is a block diagram of one embodiment of an electronic device including an image measurement system.

FIG. 1 is a block diagram of one embodiment of an electronic device 2 including an image measurement system 24. In the embodiment, the electronic device 2 further includes a display device 20, an input device 22, a storage device 23, and at least one processor 25. It should be understood that FIG. 1 illustrates only one example of the electronic device 2 that may include more or fewer components than illustrated, or a different configuration of the various components in other embodiments. The electronic device 2 may be a computer, a server, or any other computing device.

The display device 20 may be a liquid crystal display (LCD) or a cathode ray tube (CRT) display used to display the 2D image of the measured object, and the input device 22 may be a mouse or a keyboard used to input computer readable data. The storage device 23 may store the 2D image of the measured object and other measurement data of the measured object.

The image measurement system 24 is used to create a rectangular frame enclosing a two dimensional (2D) image of an object, and automatically locate a position of a marked number corresponding to a feature element of the object in the 2D image according to a horizontal position and a vertical position of the marked number in the rectangular frame. In one embodiment, a feature element may be a line, a plane, a circle, a cylinder, or a sphere, but the disclosure is not limited thereto. The image measurement system 24 may include computerized instructions in the form of one or more programs that are executed by the at least one processor 25 and stored in the storage device 23 (or memory). A detailed description of the image measurement system 24 will be given in the following paragraphs.

Figure 2:
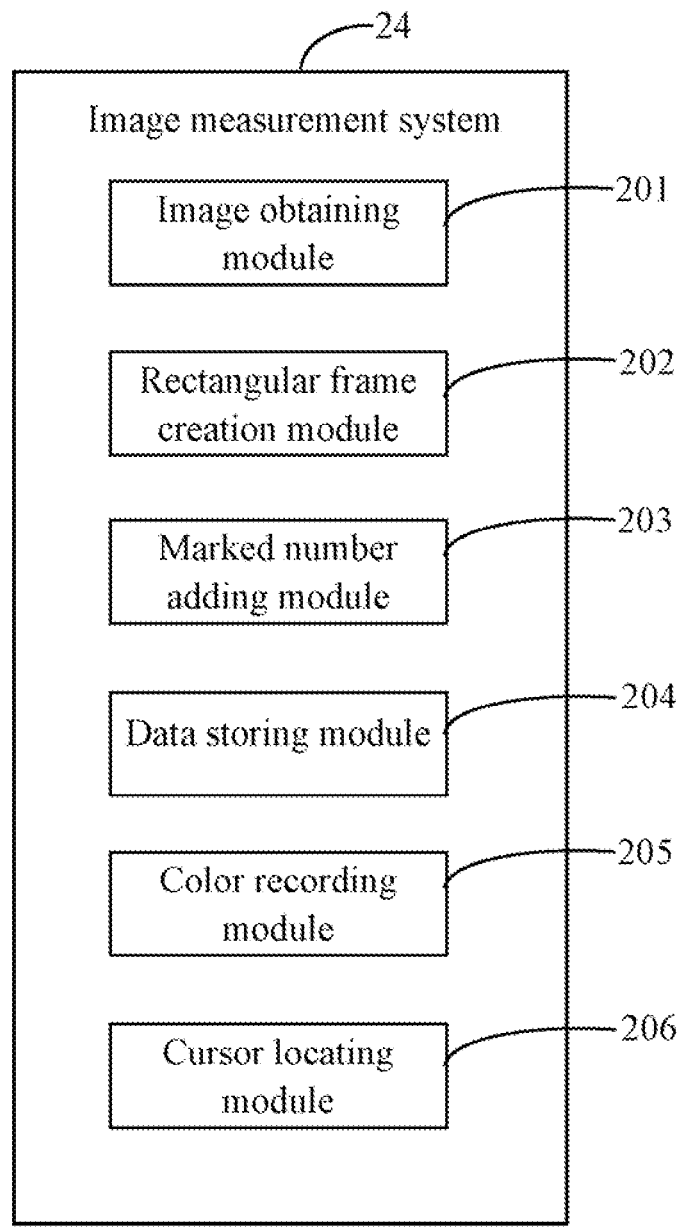
FIG. 2 is a schematic diagram of function modules of the image measurement system included in the electronic device.

FIG. 2 is a schematic diagram of function modules of the image measurement system 24 included in the electronic device 2. In one embodiment, the image measurement system 24 may include one or more modules, for example, an image obtaining module 201, a rectangular frame creation module 202, a marked number recording module 203, a data storing module 204, a color recording module 205, and a cursor locating module 206. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3A:
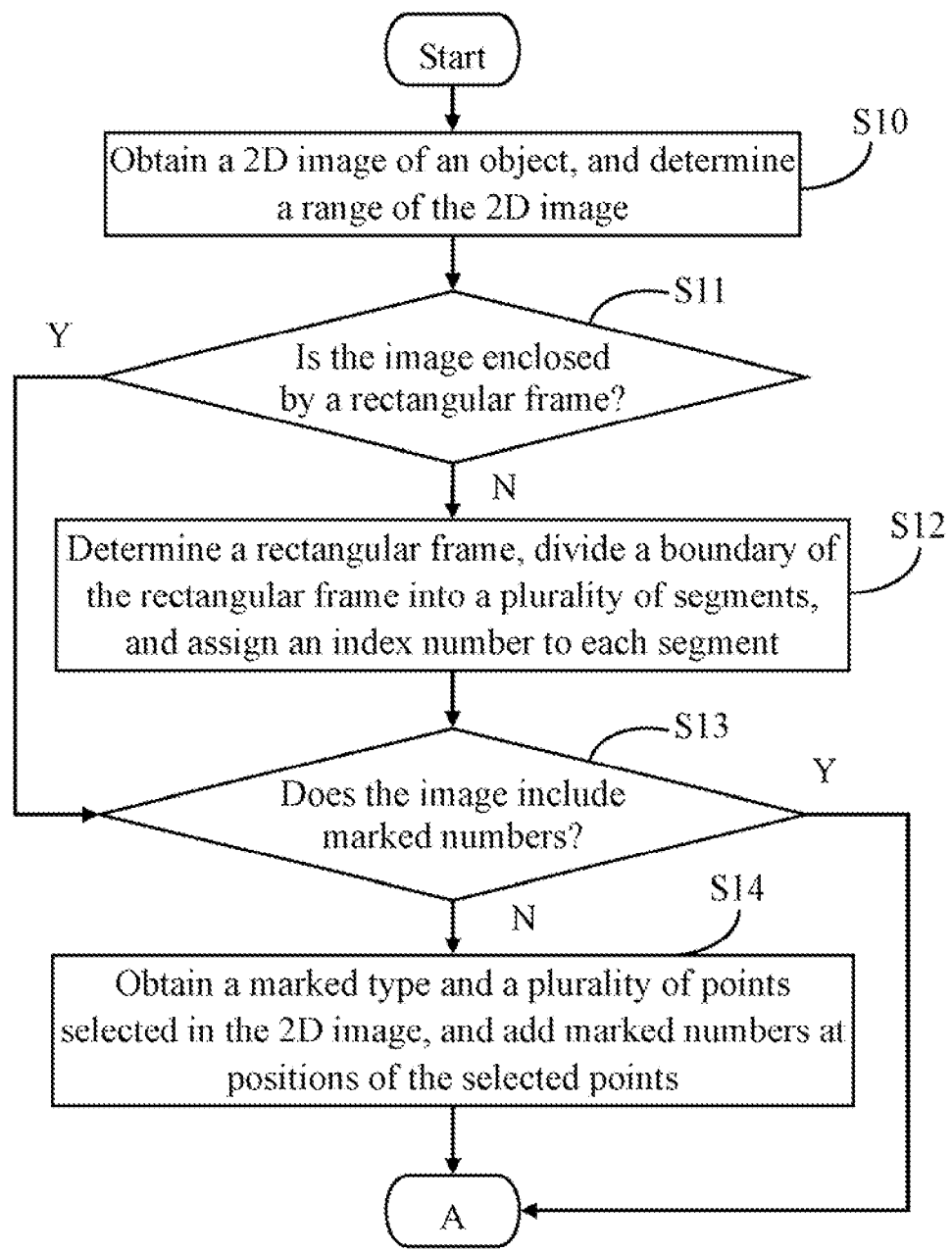
FIG. 3A and FIG. 3B are flowcharts of one embodiment of a method for automatically locating marked numbers in a two dimensional (2D) image of an object using the electronic device.
Figure 3B:
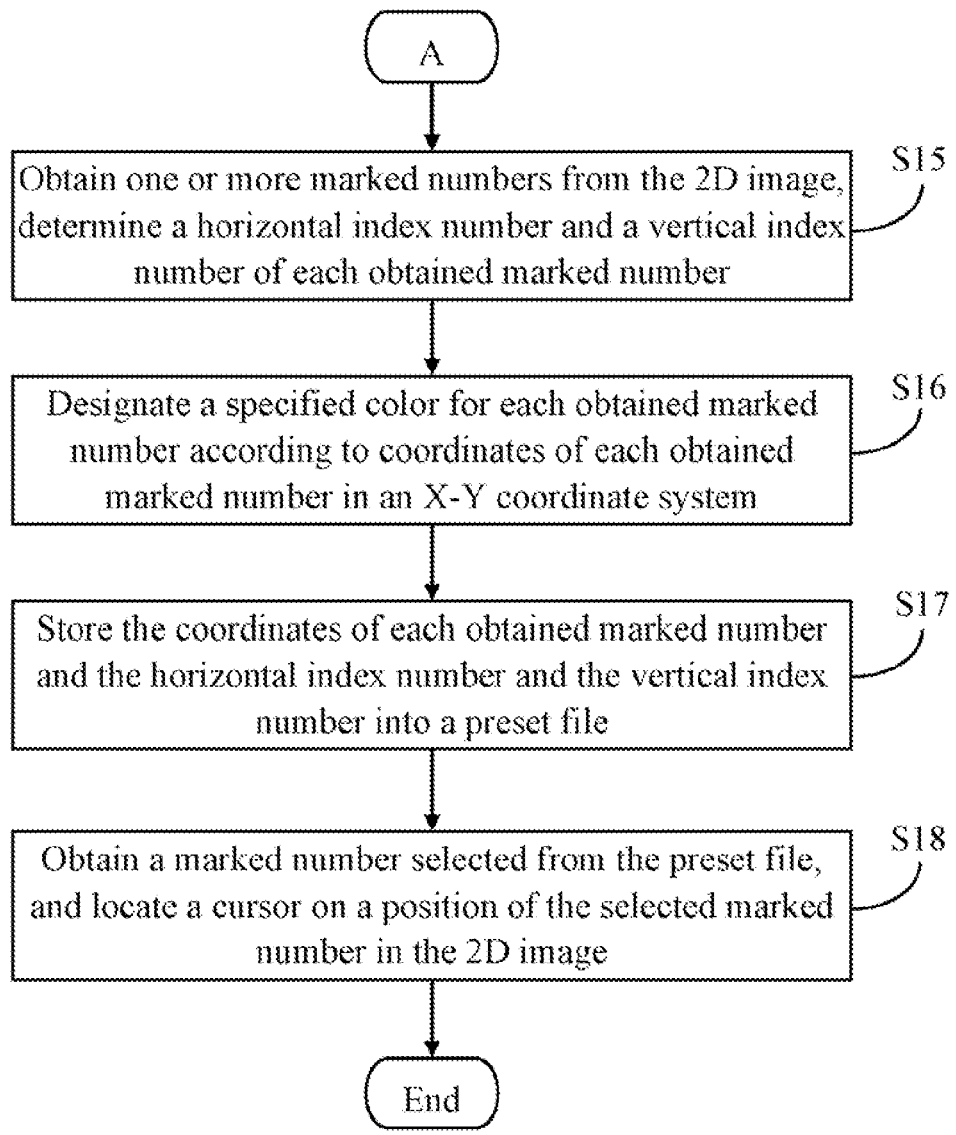

FIG. 3A and FIG. 3B are flowcharts of one embodiment of a method for locating marked numbers in a 2D image of an object automatically using the electronic device 2. Depending on the embodiment, additional steps may be added, others removed, and the ordering of the steps may be changed.

Figure 6:
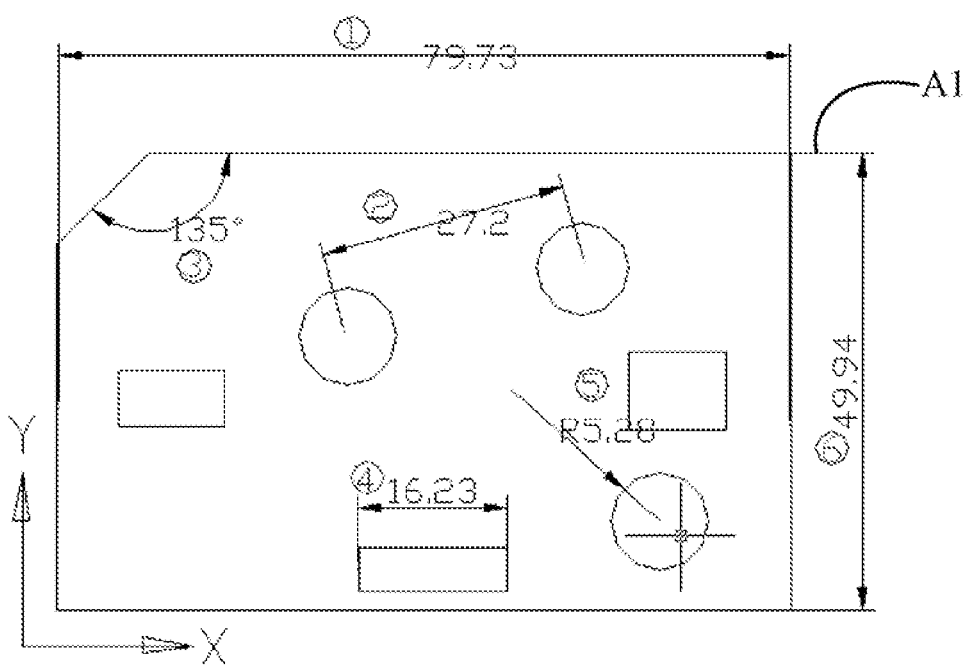
FIG. 6 is an exemplary schematic diagram of a 2D image of an object.

In step S10, the image obtaining module 201 obtains a 2D image of an object from the storage device 23 of the electronic device 2, and determines a range of the 2D image. For example, the range of the 2D image include a width and a height of the 2D image. In one embodiment, the 2D image of the object may be obtained from a computer aided design (CAD) file. The 2D image includes a plurality of marked numbers (e.g., a sequential or ordinal number) used to identify a position of the feature elements of the object. For example, the marked number is positioned near to the feature element in the image of the object, so that a user can easily find the feature element corresponding to the marked number. An exemplary schematic diagram of the marked numbers in the 2D image of the object is shown in FIG. 6, such as the encircled digits 1-3 and the corresponding quantities. In one embodiment, the marked number is positioned near to the corresponding feature element of the object.

In step S11, the rectangular frame creation module 202 determines whether the 2D image is enclosed by a rectangular frame. If the 2D image is not enclosed by a rectangular frame, the procedure goes to step S12, a rectangular frame enclosing the 2D image is created. If the 2D image is enclosed by a rectangular frame, the procedure goes to step S13.

Figure 4:
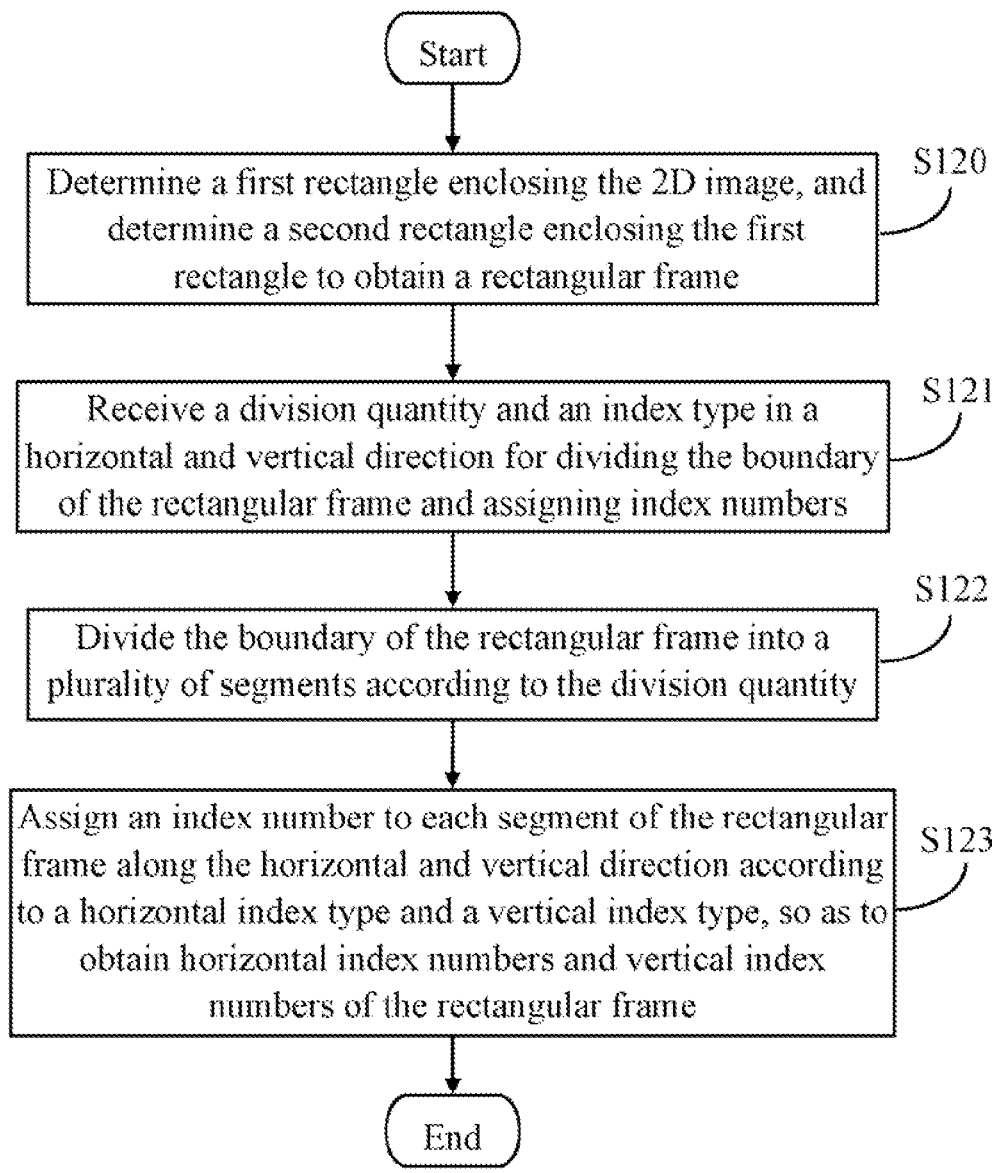
FIG. 4 is a detailed flowchart of step S12 in FIG. 3A.

In step S12, the rectangular frame creation module 202 determines a rectangular frame enclosing the 2D image according to the range of the 2D image, divides a boundary of the rectangular frame into a plurality of segments, and assigns an index number to each segment along a horizontal direction and a vertical direction of the rectangular frame, and obtains a plurality of horizontal index numbers and vertical index numbers of the rectangular frame. A detailed description of step S12 is shown in FIG. 4.

In step S13, a marked number adding module 203 determines whether the 2D image includes the marked numbers. If the 2D image does not include any marked number, the procedure goes to step S14, some marked numbers are added in response to user selection. If the 2D image includes the marked numbers, the procedure goes to step S15.

In step S14, the marked number adding module 203 obtains a type of marked number and a plurality of points selected in the 2D image, adds marked numbers at positions of the selected points according to the type of the marked number, and stores X-Y coordinates of the added marked numbers into the storage device 23 of the electronic device 2. In one embodiment, the type of the marked number may be a circle or an ellipse. The X-Y coordinates of the marked number refer to the coordinates of a center of the marked number. For example, if the type of marked number is the circle, the X-Y coordinates of the marked number are determined by the center of the circle. A detailed description of step S14 is given in FIG. 5.

In step S15, the data storing module 204 obtains one or more marked numbers from the 2D image in response to user selections, determines a horizontal index number and a vertical index number of each obtained marked number in the rectangular frame, and stores the X-Y coordinates of each obtained marked number and the horizontal index number and the vertical index number into a data structure (e.g., an array or a list). In one embodiment, the X-Y coordinates, the horizontal index number and the vertical index number are referred to as "positional information". The positional information of the marked numbers stored in the data structure may be lost when the electronic device 2 is shut down.

Figure 7:
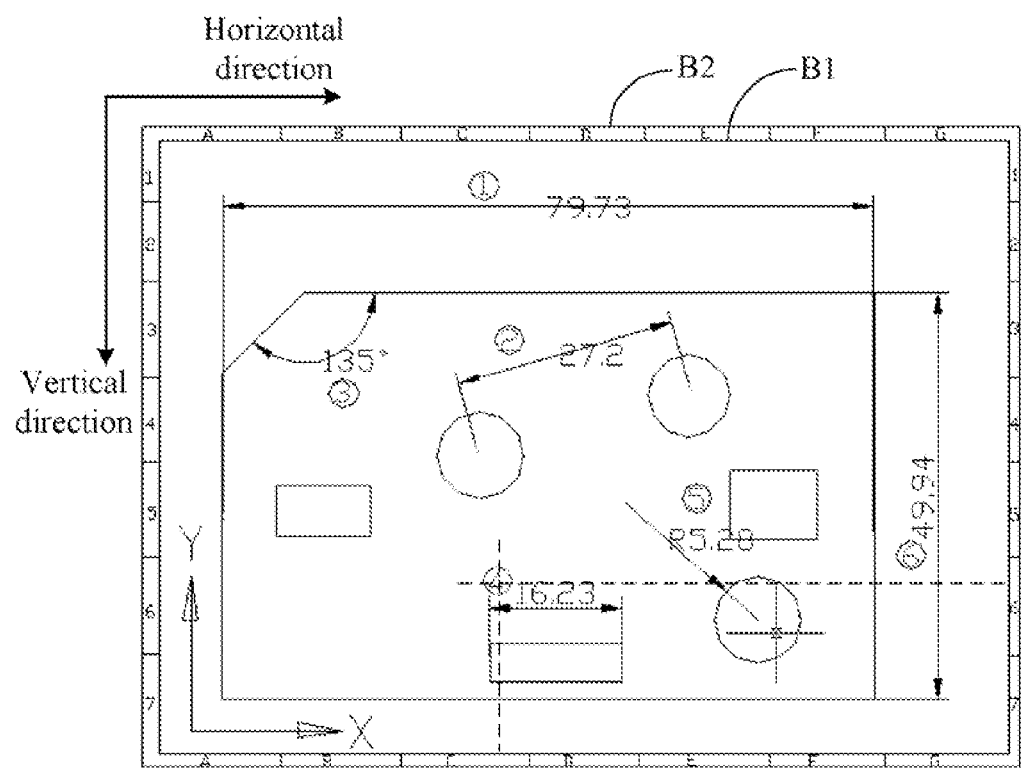
FIG. 7 is an exemplary schematic diagram of a rectangular frame enclosing the 2D image in FIG. 6.

In the present application, a position of each marked number in the 2D image may be determined by the X-Y coordinates of the marked number in an X-Y coordinate system of the 2D image, or determined by the horizontal index number and the vertical index number of the marked number in the rectangular frame enclosing the 2D image. As shown in FIG. 7, the X-Y coordinates of the fourth marked number are (55.65, 20.12), the horizontal index number of the fourth marked number is "C," and the vertical index number of the fourth marked number is "6". Thus, the positional information of the fourth marked number stored in the data structure is (4, 55.65, 20.12, C, 6).

In step S16, the color recording module 205 designates a specified color (e.g., red) for each of the obtained marked numbers according to a preset size and the X-Y coordinates of each obtained marked number. For example, if the type of the marked number is the circle, the preset size may be a radius of the marked number, such as five millimeters. In other embodiments, step S16 may be removed or executed after step S17.

Figure 8:
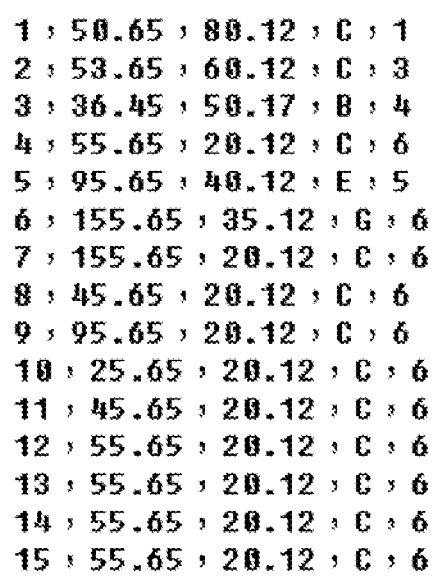

In step S17, the data storing module 204 obtains the coordinates of each obtained marked number, the horizontal index number and the vertical index number from the data structure, and stores the coordinates of each obtained marked number, the horizontal index number and the vertical index number into a preset file. The preset file is stored in the storage device 23 of the electronic device 2. The preset file may be a text file (as shown in FIG. 8) or may be in another format. The positional information of the marked numbers are permanently stored in the preset file. In this embodiment, if a marked number is recorded with color, it is an indication that the positional information of the marked number is stored in the preset file.

In step S18, the cursor locating module 206 obtains a marked number selected from the preset file, and locates a cursor on a first position of the selected marked number in the 2D image according to the coordinates of the selected marked number, or locates the cursor on a second position of the selected marked number according to the horizontal index number and the vertical index number of the selected marked number. For example, if the user selects the fourth marked number (4, 55.65, 20.12, C, 6), the cursor locating module 206 locates the cursor on the first position of (55.65, 20.12) in the X-Y coordinate system, or locates the cursor on the second position of (C, 6) in the rectangular frame.

FIG. 4 is a detailed flowchart of step S12 in FIG. 3A. Depending on the embodiment, additional steps may be added, others removed, and the ordering of the steps may be changed.

In step S120, the rectangular frame creation module 202 determines a first rectangle enclosing the 2D image, and determines a second rectangle enclosing the first rectangle, so as to obtain the rectangular frame enclosing the 2D image. For example, as shown in FIG. 7, "B1" represents the first rectangle, and "B2" represents the second rectangle. The first rectangle "B1" and the second rectangle "B2" form the rectangular frame enclosing the 2D image.

In step S121, the rectangular frame creation module 202 receives a division quantity for dividing the boundary of the rectangular frame, and receives an index type in the horizontal direction and the vertical direction of the rectangular frame for assigning index numbers in the rectangular frame.

In one embodiment, the division quantity includes a horizontal division quantity and a vertical division quantity, the index type includes a horizontal index type and a vertical index type. For example, as shown in FIG. 7, if the horizontal index type is an alphabetical character, and the horizontal division quantity is seven, the rectangular frame of the horizontal direction is divided into seven segments, such as "A"-"G". If the vertical index type is a digit, and the vertical division quantity is seven, the rectangular frame of the vertical direction is divided into seven segments, such as "1"-"7".

In step S122, the rectangular frame creation module 202 divides the boundary of the rectangular frame into a plurality of segments along the horizontal direction and the vertical direction of the rectangular frame according to the horizontal division quantity and the vertical division quantity.

In step S123, the rectangular frame creation module 202 assigns an index number to each segment of the rectangular frame along the horizontal and vertical direction according to the horizontal index type and the vertical index type, and obtains horizontal index numbers and vertical index numbers of the rectangular frame. For example, as shown in FIG. 7, the horizontal index numbers of the rectangular frame are "A" to "G", the vertical index numbers of the rectangular frame are "1" to "7".

Figure 5:
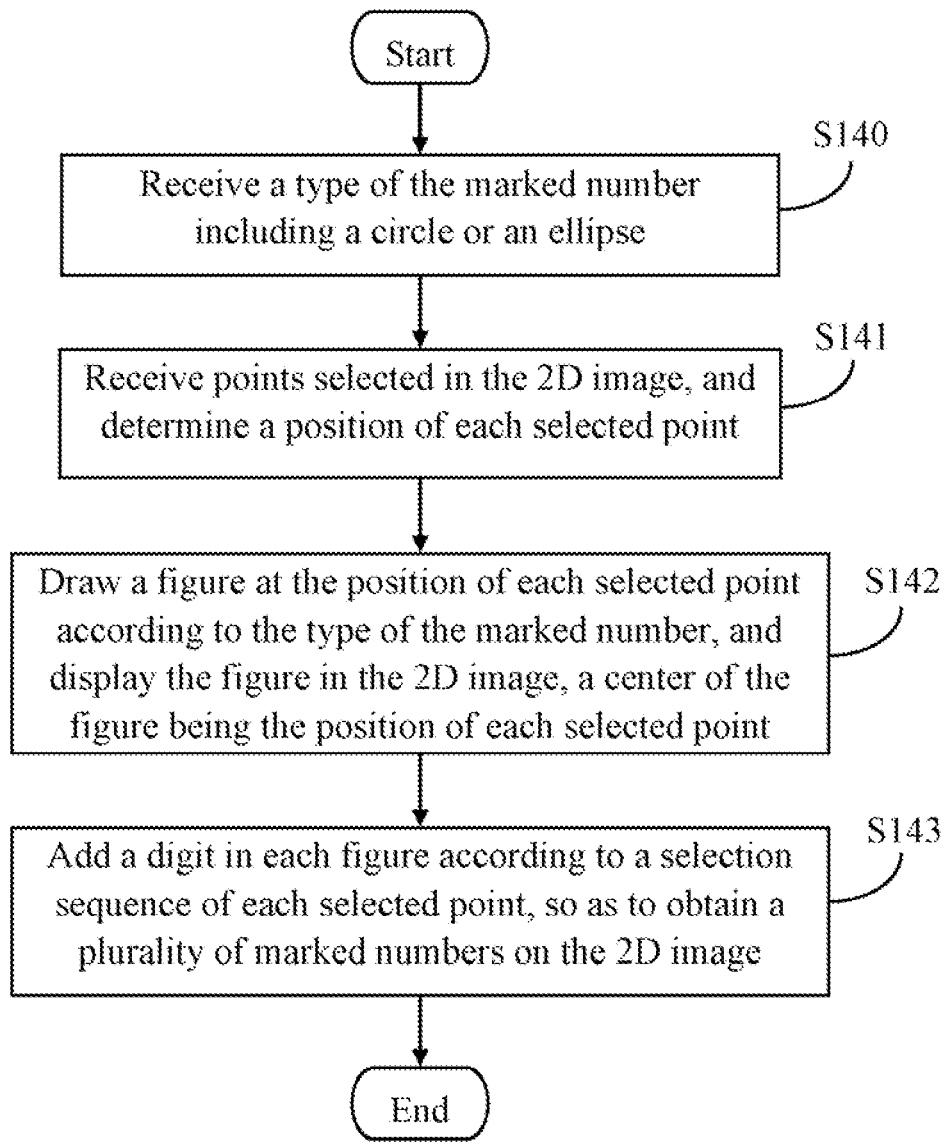
FIG. 5 is a detailed flowchart of step S14 in FIG. 3A.

FIG. 5 is a detailed flowchart of step S14 in FIG. 3A. Depending on the embodiment, additional steps may be added, others removed, and the ordering of the steps may be changed.

In step S140, the marked number adding module 203 obtains a type of marked number selected by the user. For example, the type of the marked number may be a circle or an ellipse.

In step S141, the marked number adding module 203 obtains a plurality of points selected in the 2D image in response to the user selections, and determines the coordinates of each selected point in the X-Y coordinate system of the 2D image.

In step S142, the marked number adding module 203 determines a position of each selected point in the X-Y coordinate system of the 2D image according to the coordinates of each selected point, draws a figure at the position of each selected point according to the type of the marked number, and displays the figure in the 2D image. A center of the figure is the position of each selected point. For example, if the type of the marked number is the circle, the marked number adding module 203 draws a circle at the position of each selected point, and a radius of the circle may be five millimeters.

In step S143, the marked number adding module 203 adds a digit in each figure according to a selection sequence of each selected point, and obtains a plurality of marked numbers on the 2D image. For example, if the selected point is the first one selected, the digit added to the marked number is "1", if the selected point is the second one selected, the digit added to the marked number is "2", and so on.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computerized-implemented method for locating marked numbers in a two dimensional (2D) image of an object using an electronic device comprising a processor, the method being performed by execution of computerized instructions by the processor of the electronic device, the method comprising:
   obtaining the 2D image of the object from a storage device of the electronic device, and displaying the 2D image of the object on a display device of the electronic device;
   determining a rectangular frame enclosing the 2D image, dividing a boundary of the rectangular frame into a plurality of segments, and assigning an index number to each segment along a horizontal direction and a vertical direction of the rectangular frame; and
   obtaining a marked number selected from a preset file, and locating a cursor on a first position of the marked number in the 2D image according to coordinates of the marked number, or locating the cursor on a second position of the marked number according to a horizontal index number and a vertical index number of the marked number.

2. The method according to claim 1, wherein the rectangular frame is obtained by:
   determining a first rectangle enclosing the 2D image; and
   determining a second rectangle enclosing the first rectangle, and obtaining the rectangular frame enclosing the 2D image.

3. The method according to claim 2, further comprising obtaining horizontal index numbers and vertical index numbers of the rectangular frame by:
   dividing the boundary of the rectangular frame into the segments along the horizontal direction and the vertical direction of the rectangular frame according to a preset horizontal division quantity and a preset vertical division quantity;
   assigning an index number to each segment of the rectangular frame along the horizontal and vertical direction according to a preset horizontal index type and a preset vertical index type, and obtaining horizontal index numbers and vertical index numbers of the rectangular frame.

4. The method according to claim 1, further comprising:
   obtaining a type of marked number and a plurality of points selected in the 2D image upon the condition that the 2D image does not have the marked number, adding marked numbers at positions of the selected points according to the type of the marked number, and storing X-Y coordinates of the added marked numbers into the storage device of the electronic device.

5. The method according to claim 4, wherein the step of adding marked numbers at positions of the selected points according to the marked type comprising:
   determining a position of each selected point in an X-Y coordinate system of the 2D image;
   drawing a figure at the position of each selected point according to the type of the marked number, and displaying the figure in the 2D image, a center of the figure being the position of each selected point; and
   adding a digit in each figure according to a selection sequence of each selected point, and obtaining a plurality of marked numbers on the 2D image.

6. The method according to claim 1, further comprising:
   obtaining one or more marked numbers selected from the 2D image;
   determining a horizontal index number and a vertical index number of each obtained marked number in the rectangular frame; and
   storing coordinates of each obtained marked number and the horizontal index number and the vertical index number into a preset file.

7. The method according to claim 6, further comprising:
   designating a specified color for each of the obtained marked numbers according to coordinates of each obtained marked number in an X-Y coordinate system of the 2D image.

8. An electronic device, comprising:
   a storage device;
   at least one processor; and
   one or more modules that are stored in the storage device and executed by the at least one processor, the one or more modules comprising:
   an image obtaining module that obtains a two dimensional (2D) image of an object from the storage device;
   a rectangular frame creation module that determines a rectangular frame enclosing the 2D image, divides a boundary of the rectangular frame into a plurality of segments, and assigns an index number to each segment along a horizontal direction and a vertical direction of the rectangular frame; and a cursor locating module that obtains a marked number selected from a preset file, and locates a cursor on a first position of the marked number in the 2D image according to coordinates of the marked number, or locates the cursor on a second position of the marked number according to a horizontal index number and a vertical index number of the marked number.

9. The electronic device according to claim 8, wherein the rectangular frame creation module determines the rectangular frame by:

determining a first rectangle enclosing the 2D image; and determining a second rectangle enclosing the first rectangle, and obtaining the rectangular frame enclosing the 2D image.

10. The electronic device according to claim 9, wherein rectangular frame creation module further obtains horizontal index numbers and vertical index numbers of the rectangular frame by:

dividing the boundary of the rectangular frame into the segments along the horizontal direction and the vertical direction of the rectangular frame according to a preset horizontal division quantity and a preset vertical division quantity;

assigning an index number to each segment of the rectangular frame along the horizontal and vertical direction according to a preset horizontal index type and a preset vertical index type, and obtaining horizontal index numbers and vertical index numbers of the rectangular frame.

11. The electronic device according to claim 8, wherein the one or more modules further comprise:

a marked number adding module that obtains a type of marked number and a plurality of points selected in the 2D image upon the condition that the 2D image does not have the marked number, adds marked numbers at positions of the selected points according to the type of the marked number, and stores X-Y coordinates of the added marked numbers into the storage device.

12. The electronic device according to claim 11, wherein the marked number adding module adds marked numbers at positions of the selected points according to the marked type by:

determining a position of each selected point in an X-Y coordinate system of the 2D image;

drawing a figure at the position of each selected point according to the type of the marked number, and displaying the figure in the 2D image, a center of the figure being the position of each selected point; and adding a digit in each figure according to a selection sequence of each selected point, and obtaining a plurality of marked numbers on the 2D image.

13. The electronic device according to claim 8, wherein the one or more modules further comprise:

a data storing module that obtains one or more marked numbers from the 2D image, determines a horizontal index number and a vertical index number of each obtained marked number in the rectangular frame, and stores coordinates of each obtained marked number and the horizontal index number and the vertical index number into a preset file.

14. The electronic device according to claim 13, wherein the one or more modules further comprise:

a color recording module that designates a specified color for each of the obtained marked numbers according to coordinates of each obtained marked number in an X-Y coordinate system of the 2D image.

15. A non-transitory storage computer-readable storage medium having stored thereon instructions that, when executed by a processor of an electronic device, causes the electronic device to perform a method for locating marked numbers in a two dimensional (2D) image of an object, the method comprising:

obtaining the 2D image of the object from a storage device of the electronic device;

determining a rectangular frame enclosing the 2D image, dividing a boundary of the rectangular frame into a plurality of segments, and assigning an index number to each segment along a horizontal direction and a vertical direction of the rectangular frame; and obtaining a marked number selected from a preset file, and locating a cursor on a first position of the marked number in the 2D image according to coordinates of the marked number, or locating the cursor on a second position of the marked number according to a horizontal index number and a vertical index number of the marked number.

16. The non-transitory computer-readable storage medium according to claim 15, wherein the rectangular frame is obtained by:

determining a first rectangle enclosing the 2D image; and determining a second rectangle enclosing the first rectangle, and obtaining the rectangular frame enclosing the 2D image.

17. The non-transitory computer-readable storage medium according to claim 16, wherein the method further comprises obtaining horizontal index numbers and vertical index numbers of the rectangular frame by:

dividing the boundary of the rectangular frame into the segments along the horizontal direction and the vertical direction of the rectangular frame according to a preset horizontal division quantity and a preset vertical division quantity;

assigning an index number to each segment of the rectangular frame along the horizontal and vertical direction according to a preset horizontal index type and a preset vertical index type, and obtaining horizontal index numbers and vertical index numbers of the rectangular frame.

18. The non-transitory computer-readable storage medium according to claim 15, wherein the method further comprises:

obtaining a type of marked number and a plurality of points selected in the 2D image upon the condition that the 2D image does not have the marked number, adding marked numbers at positions of the selected points according to the type of the marked number, and storing X-Y coordinates of the added marked numbers into the storage device of the electronic device.

19. The non-transitory computer-readable storage medium according to claim 18, wherein the step of adding marked numbers at positions of the selected points according to the marked type comprising:

determining a position of each selected point in an X-Y coordinate system of the 2D image;

drawing a figure at the position of each selected point according to the type of the marked number, and displaying the figure in the 2D image, a center of the figure being the position of each selected point; and adding a digit in each figure according to a selection sequence of each selected point, and obtaining a plurality of marked numbers on the 2D image.

20. The non-transitory computer-readable storage medium according to claim 15, wherein the method further comprises:

obtaining one or more marked numbers from the 2D image;

determining a horizontal index number and a vertical index number of each obtained marked number in the rectangular frame;

designating a specified color for each of the obtained marked numbers according to coordinates of each obtained marked number in an X-Y coordinate system of the 2D image; and storing the coordinates of each obtained marked number and the horizontal index number and the vertical index number into a preset file.

* * * * *